United States Patent [19]

Shaffer

[11] Patent Number: 5,044,738
[45] Date of Patent: Sep. 3, 1991

[54] WIDE ANGLE VIEWING SYSTEM
[75] Inventor: James E. Shaffer, Maitland, Fla.
[73] Assignee: Consulier Engineering, Inc., Rivieria Beach, Fla.
[21] Appl. No.: 448,645
[22] Filed: Dec. 11, 1989
[51] Int. Cl.$^5$ .................. G02B 23/16; G02B 7/00; H01J 3/14
[52] U.S. Cl. .................. 359/504; 250/236; 359/403; 359/429
[58] Field of Search ...... 250/203 R, 206, 203.1–203.7, 250/227, 234, 236; 350/274–275, 537–550, 571–581, 500–502, 320, 321

[56] References Cited
U.S. PATENT DOCUMENTS

| 3,203,305 | 8/1965 | Fairbanks | 250/203.7 |
| 3,912,398 | 10/1975 | Zenk | 250/203.6 |
| 4,085,910 | 4/1978 | Baker et al. | 350/500 |
| 4,398,811 | 8/1983 | Nishioka et al. | 350/575 |
| 4,654,518 | 3/1987 | Astheimer | 250/236 |
| 4,659,192 | 4/1987 | Chadwick et al. | 350/574 |
| 4,717,822 | 1/1988 | Byren | 250/236 |
| 4,717,823 | 1/1988 | Steimel et al. | 250/236 |

Primary Examiner—Bruce Y. Arnold
Assistant Examiner—Thong Nguyen
Attorney, Agent, or Firm—Harry W. Barron

[57] ABSTRACT

An optical system for scanning a wide angle conical field of regard through a small aperture and with a narrow field of view device includes a first optical offsetting device rotated about a first axis coincident to the axis of the conical field of regard. The first offsetting optical device receives light along a second optical axis which at a certain acute angle with respect to the first axis. A second optical offsetting device is positioned at the output side of the first device and is rotated about the second axis. The second offsetting device also receives light along a third optical axis, which is at the certain angle with respect to the second axis. The first, second and third axes intersect in front of the system in the narrow aperture through which the viewing takes place. By rotating each of the two optical offsetting devices, an entire area having a field of regard of twice the certain angle from the viewing aperture may be mapped.

22 Claims, 3 Drawing Sheets

WIDE ANGLE VIEWING SYSTEM

BACKGROUND OF THE INVENTION

1. Field of the Invention

This invention relates to an optical device, and more particularly, to an optical device having a conical field of regard which may be used to view an area with a wide angle of view.

2. Background Information

In many instances it is desirable to use a magnifying optical device having a generally narrow cylindrical field of view, such as a telescope, to view a large area with a large field of regard. Such a device is typically fabricated in a long tube and includes two or more lenses used for magnifying the image being viewed. Viewing a large area is typically accomplished by moving the end of the optical device relative to a stationary eye piece in order to view many small fields, or subareas, within the overall larger area to be viewed. By moving the end of the optical device remote from the eyepiece, a large viewing aperture is acquired.

In many instances, there is a difficulty in providing a large viewing aperture. For example, some viewing areas require special materials, such as sophisticated microwave or infrared filters, which are expensive to fabricate, particularly in large areas. Further, space limitations may prevent a large aperture from being available.

3. Description of the Prior Art

The prior art has suggested using a narrow field of view optical device, which is rotated throughout the area to be viewed in order to obtain mapping data regarding the entire area being viewed. For example, see U.S. Pat. No. 4,717,822 in the name of Robert W., Byrens and entitled "Rosette Scanning Surveillance Sensor". The Byrens device utilizes generally orthogonal gimbals and thus is complicated, expensive and is difficult to control. What is needed is a simpler and more effective optical device to permit scanning and mapping of a wide area using a narrow field of view optical device which views through a small aperture.

SUMMARY OF THE INVENTION

In accordance with one aspect of this invention, there is provided a wide angle viewing system including a first optical device having a viewing port aligned with a first axis and further having an output port aligned with a second axis. The second axis is spaced from the first axis and the second axis is at a first acute angle with respect to the first axis in a direction away from the output port. In addition, the system includes first means for rotating the first optical device about the first axis. Further, the system includes a second optical device having an input port positioned in alignment with the second axis and further having an output port positioned along a third axis, which is at a second acute angle with respect to the second axis in a direction away from the second device output port. Finally the system includes second means for rotating the second optical device about the second axis.

BRIEF DESCRIPTION OF THE DRAWINGS

One preferred embodiment of the subject invention is hereafter described with specific reference being made to the following figures, in which.

DESCRIPTION OF THE PREFERRED EMBODIMENT

Figure 1:
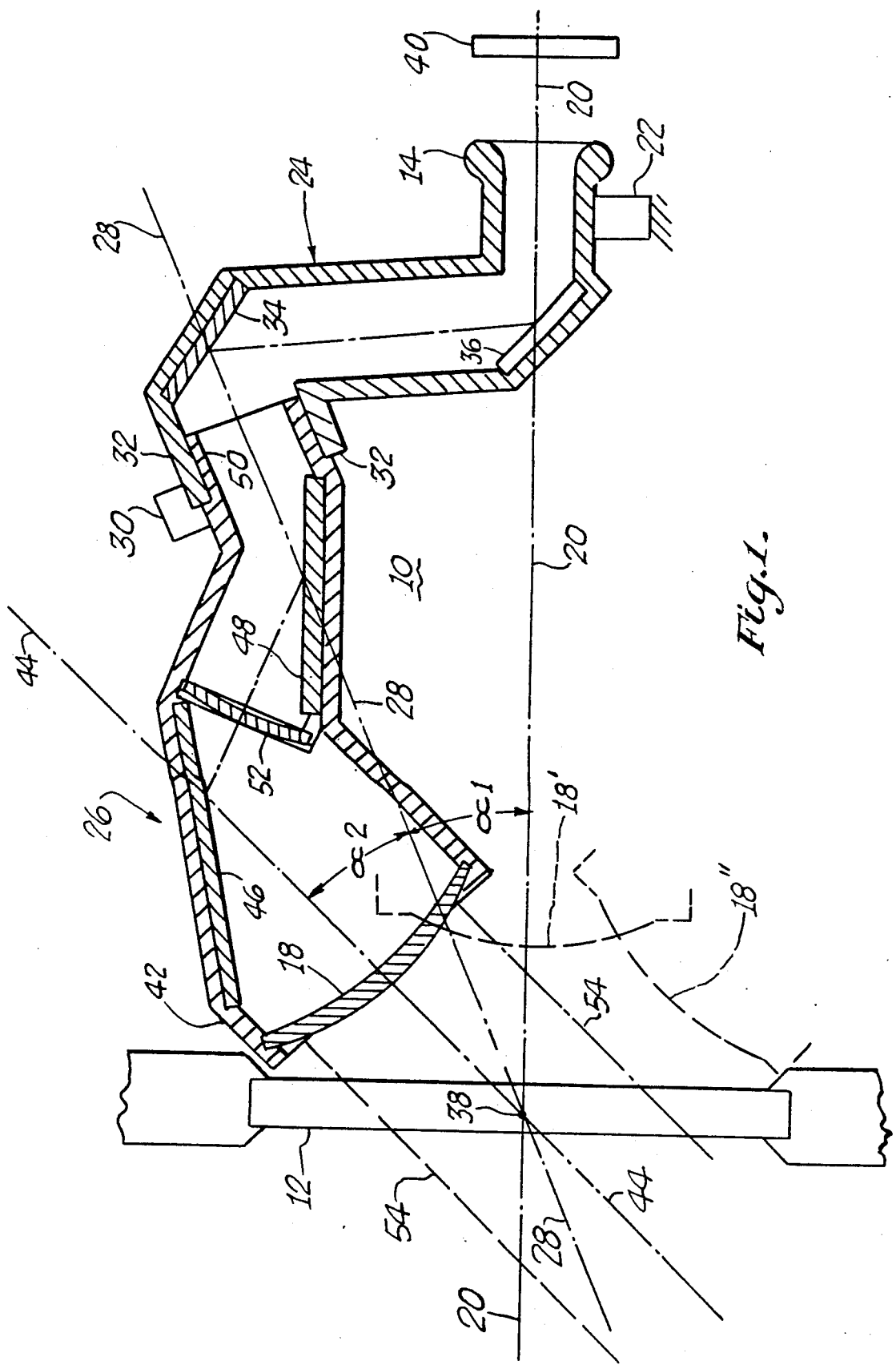
FIG. 1 schematically shows, partially in cross section, a preferred embodiment of the optical device of the subject invention.

Referring now to FIG. 1, one preferred embodiment of the scanning optical, or viewing, system 10 of the subject invention is shown. Optical system 10 is designed to be used in a situation where a small aperture window 12 is available. Optical system 10 includes an eyepiece 14 on one side and an objective lens 18 at the other side. An axis 20 is oriented through the center of eyepiece 14 and the center of window 12. A rotating mechanism 22 is positioned to rotate eyepiece 14, and thus the entire optical system 10, about axis 20 a full 360°. Axis 20 is, thus, both the optical axis for the light being viewed through eyepiece 14 and the main axis of rotation of optical system 10.

Generally, optical system 10 includes two separate optical offsetting component devices 24 and 26. The optical offsetting devices 24 and 26 are each designed to provide the light applied thereto along a different path and, thus, are similar to a periscope. However, as will be explained hereafter, the angles between the incoming light and the provided light is not orthogonal, as would be the case with a conventional periscope. In addition, offsetting device 26 is positioned so that the output optical axis of device 24 and the input optical axis of device 26 are along the same axis 28. Finally, a second rotating mechanism 30 is positioned to rotate offsetting device 26 about its axis 28.

Referring specifically to offsetting device 24, device 24 is fabricated generally of tubular materials and receives incoming light at the input end 32 thereof along axis 28. A pair of mirrors 34 and 36 reflect the light applied along axis 28 so that it exits through eyepiece 14 along axis 20. Axes 20 and 28 are positioned at an angle with respect to one another so that they intersect at point 38, which may be in the center of window 12. The exact positioning of mirrors 34 and 36 will depend upon the distance between eyepiece 14 and window 12 and the distance between mirrors 34 and 36 in order to determine the exact angle $\alpha_1$ between axis 28 and axis 20. The field of view as seen through eyepiece 14 is limited by the tubular design of offsetting device 24. A receiver device 40 may be positioned along axis 20 adjacent to eyepiece 14 for processing or recording the light waves seen through eyepiece 14. Such a receiver device may include a TV camera, recorder, film strip, or other sensor device.

Referring now to offsetting device 26, device 26 also is fabricated generally of tubular materials and receives incoming light through objective lens 18 at the input end 42 thereof along axis 44. A pair of mirrors 46 and 48 reflect the light applied along axis 44 so that it exits through the output end 50 of offsetting device 26 along axis 28. A lens 52 may also be provided within offsetting device 26 to optically co-operate with objective lens 18 to provide proper images at eyepiece 14.

Axes 44 and 28 are positioned at an angle with respect to one another so that they intersect at point 38 in the center of window 12. The exact positioning of mirrors 46 and 48 will depend upon the horizontal distance between output end 50 and window 12 and the vertical distance between end 50 and axis 20. Further, in the preferred embodiment shown in FIG. 1, the angle $\alpha_2$ between axes 44 and 28 is selected to be the same as the angle $\alpha_1$ between axes 28 and 20. With the construction of the elements as described above, a field of view 54 is projected to eyepiece 14 through offsetting devices 26 and 24. This field of view 54 is generally cylindrical, or slightly expanding or contracting, and is typically limited by the size of the tubular materials used to construct the optical offsetting devices 24 and 26.

It should be noted that the above description, illustrating the two angles $\alpha_1$ and $\alpha_2$ as being equal and that the three axes 20, 28 and 44 as intersecting at common point 38 in window 12, is not mandatory. However, if it is desired to minimize the size of window 12, then $\alpha_1$ must equal $\alpha_2$ and point 38 must be common and within window 12. Where a larger window 12 is available, the two sets of axes 20 and 28 and 28 and 44 may intersect at two different points and the angles $\alpha_1$ and $\alpha_2$ may be unequal.

The output end 50 of offsetting device 26 is designed to be juxtaposed with or to fit within the input end 32 of offsetting device 24. In addition, rotating mechanism 30 interacts with the output end 50 of device 26 to rotate offsetting device 26 about axis 28. As will be hereafter explained in detail with respect to FIGS. 2A-2D and FIG. 3, rotating mechanisms 30 and 22 operate together to position objective lens 18 at various positions adjacent to window 12. Specifically, rotating mechanism 30 rotates offsetting device 26 about axis 28 a full 360°; thus, objective lens may be positioned at 18'. along axis 20, or at any position between 18 and 18'. Similarly, rotating mechanism 22 rotates the entire optical system 10 about axis 20 a full 360°; thus, objective lens may be positioned at 18", or at any position between 18 and 18". By using the two rotating mechanisms 22 and 30 together, objective lens can be positioned at an infinite number of positions in front of window 12.

Figure 2A:
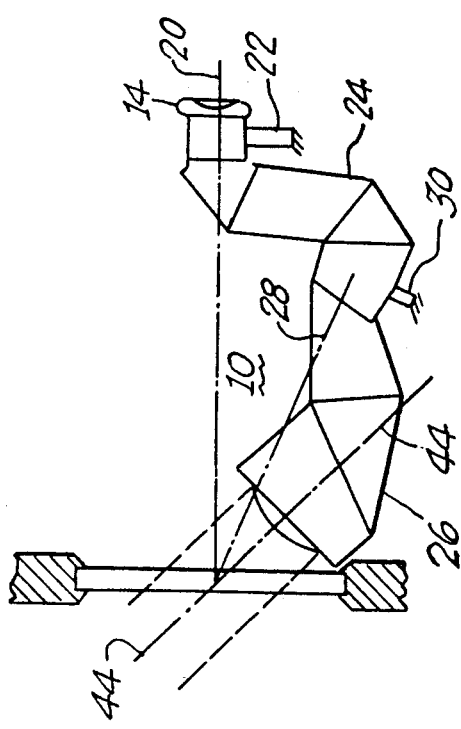
FIGS. 2A through 2D show various positions at which the optical device shown in FIG. 1 may be controlled to be positioned.
Figure 2B:
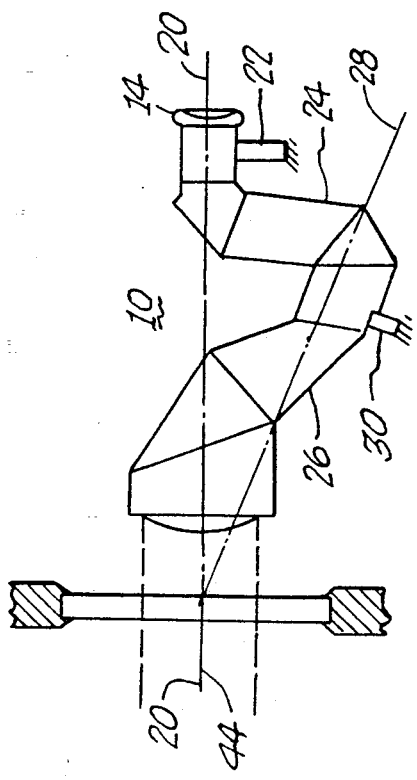
Figure 2C:
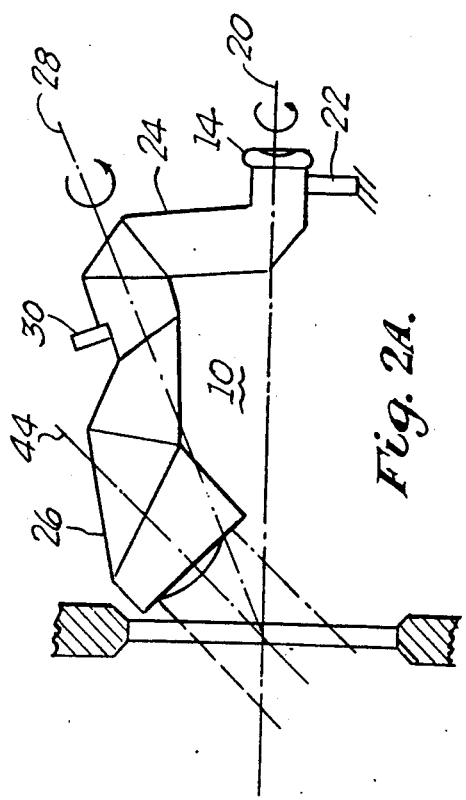
Figure 2D:
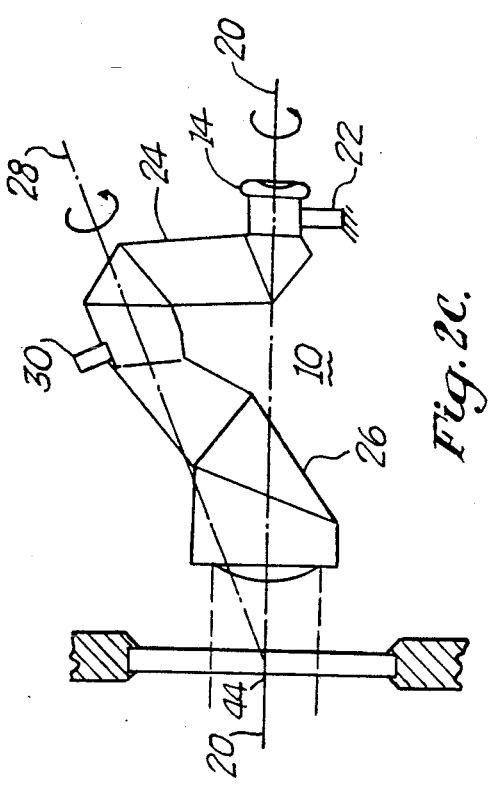

Referring now to FIGS. 2A through 2D and FIGS. 3 and 4, the operation of system 10 will be described. FIG. 2A shows the position of optical system 10 as described with respect to FIG. 1 and is referred to as the "A", or home, position. FIG. 2B shows optical system 10 in which mechanism 22 has caused a 180° rotation about axis 20 from the A position and is referred to as the "B" position. FIG. 2C shows the position of optical system 10 where only offsetting device 26 has been rotated by rotating mechanism 30 180° about axis 28 from the A position, and is referred to as the "C" position. Finally, FIG. 2D shows optical system 10 in which both rotating mechanisms 22 and 30 have rotated optical system 10 and offsetting device 26 by 180° degrees from the A position and is referred to as the "D" position.

Figure 3:
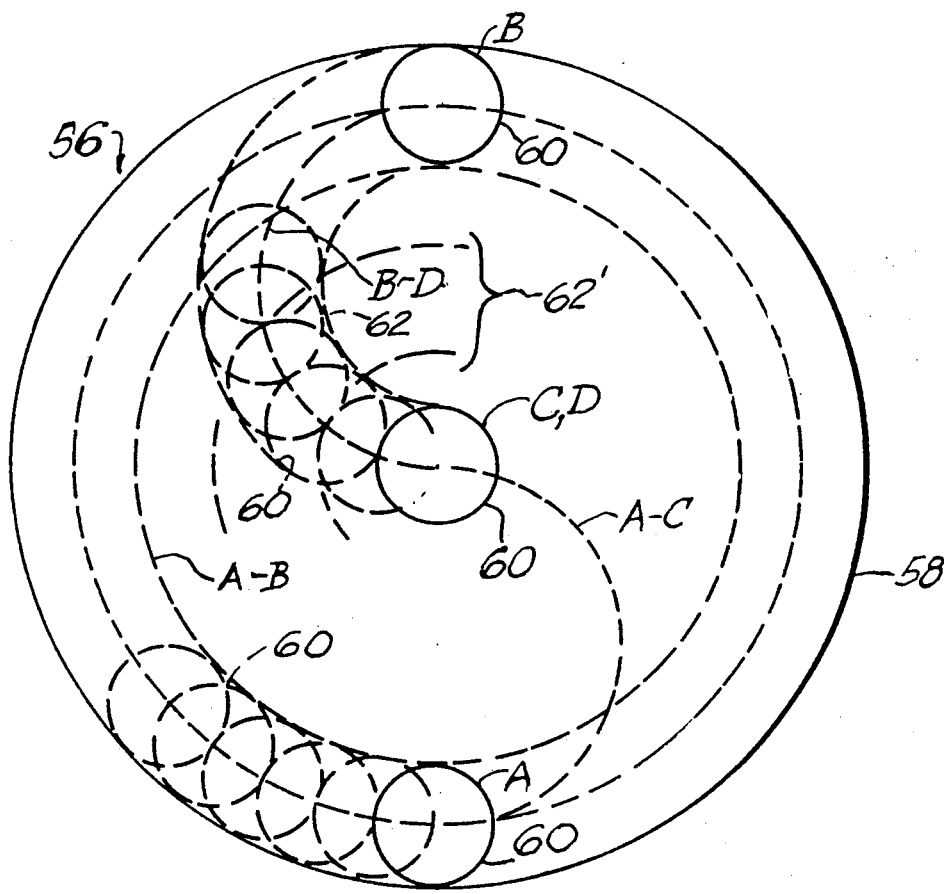
FIG. 3 shows a map of one method of rotating the apparatus shown in FIG. 1 in order to map an entire viewing area.
Figure 4:
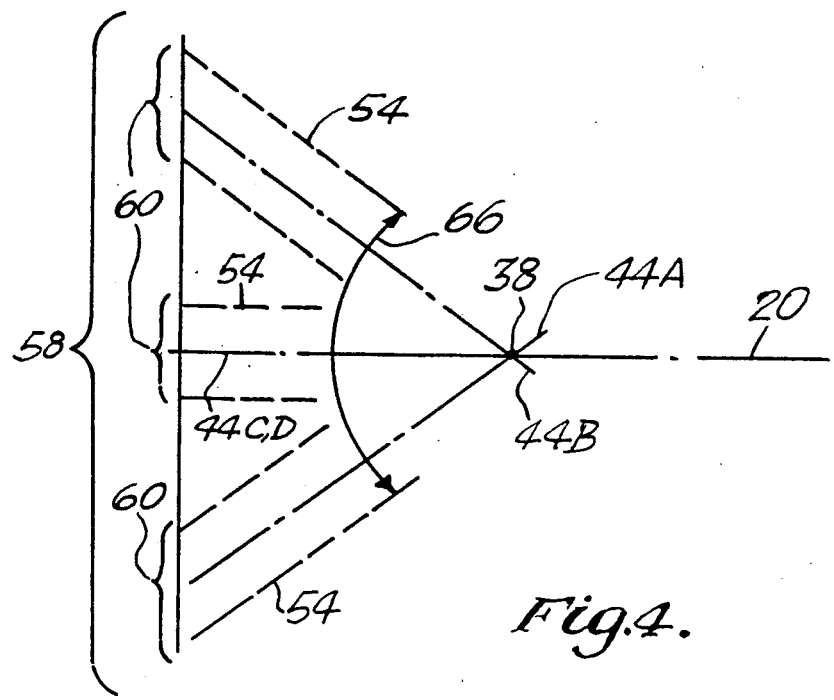
FIG. 4 shows a side view of the mapping process shown by FIG. 3.

FIG. 3 represents a map 56 of an area 58 to be viewed by optical system 10 and FIG. 4 represents a side view showing how the mapping may be accomplished. For convenience of illustration, area 58 is shown as circular, although this in not mandatory. For example, if axis 20 is not perpendicular to area 58, the shape of area 58 will be elliptical. Each of the small circles 60 within area 58 represents the field of view 54 at one instantaneous, or fixed, position, that is each circle 60 represents what is seen at any one position of optical system 10. It should be noted that the outer circles will actually be slightly elliptical, although they are shown as circular for clarity.

Specifically, when optical system 10 is in the A position, as represented by FIG. 2A, the area within the lowermost circle A is being viewed; when optical system 10 is in the B position, as represented by FIG. 2B, the area within the uppermost circle B is being viewed; and when optical system 10 is in the C or D positions, as represented by FIGS. 2C and 2D, the area within the center circle C,D is being viewed.

FIG. 4 represents a side view of the axes 20 and 44 permitting the mapping illustrated by FIG. 3 to be accomplished. The field of regard from point 38 in window 12 is a cone having an angle 66. The field of regard cone is also defined by axis 44 when optical system 10 is in the A and B positions and has an apex angle equal to the sum of said first and second acute angles, $\alpha_1$ and $\alpha_2$, seen in FIG. 1. The axis of the cone is along axis 20 and axes 44 when optical system 10 is in the C and D positions.

As rotating mechanism 22 rotates optical system 10 from the A position to the B position, that is from the FIG. 2A position to the FIG. 2B position, circle A in FIG. 3 follows the path A—B in FIG. 3. By selectively operating receiver 40, such as at the time it is viewing each of the dashed circles along the A—B path, the entire A—B area of area 58 may be viewed and mapped. This, of course assumes that mechanism 22 rotates optical system 10 an entire 360°, and not just the 180° necessary to travel from position A to position B as seen in FIG. 2.

As rotating mechanism 30 rotates offsetting device 26, for example from the B position to the D position, the field of view, as represented by circles 60, travels along the B—D path. This path is an arc area from the periphery of area 58 to the center thereof, that is, from circle B to circle C,D for example. By using rotating mechanism 30 to only rotate offsetting device 26 in selective steps, such as shown by the individual dashed circles 60 within the B—D arc area, and then using rotating mechanism 22 to rotate the entire optical system 10 a full 360°, a plurality of arc areas, concentric to arc area A—B, will be scanned within area 58. For example, as circle 62 scans an arc area 62' within area 58.

By combining the scanned optical data in receiver 40 from each of the concentric arc areas, such as arc area A—B or arc area 62', a map of the entire area 58 can be obtained. Alternatively, both rotating mechanisms 22 and 30 may be continuously operated and a helical path will be scanned and the information can be processed and mapped. Generally, rotating mechanism 30 will operate much slower than rotating mechanism 22 in this type of scan. In addition, rotating mechanisms 22 and 30 may be operated in conjunction with one another to move the viewed area from any area 60 to any other area 60 within the entire area 58 for observation of specific details noted from the general scan.

While the preferred embodiment has been described with respect to optical devices, the invention is equally useful in scanning any area to detect other types of energy, such as X-rays, radiation and so forth.

What is claimed is:

1. A viewing system for viewing with a wide angle from a small aperture comprising:

a first device having a viewing port aligned with a first axis and an input port aligned with a second axis, said input port being spaced from said first axis and said second axis being at a first acute angle with respect to said first axis in a direction away from said input port;

first means for rotating said first device about said first axis;

a second device having an output port positioned in alignment with said second axis and further having an input port positioned along a third axis, which is at a second acute angle with respect to said second axis in a direction away from said second device input port, said first, second and third axes intersecting at said aperture; and second means for rotating said second device about said second axis.

2. The invention according to claim 1 wherein said first and second acute angles are equal.

3. The invention according to claim 1 wherein said second device is positioned so that the output port thereof is juxtaposed with the input port of said first device.

4. The invention according to claim 1 wherein said second axis is the input port viewing axis of said first device, the output viewing axis of said second device and the axis of rotation of said second device.

5. The invention according to claim 1 wherein said system has a field of view within a conical field of regard, said field of regard having an apex angle equal to the sum of said first and second acute angles.

6. The invention according to claim 5 wherein said first and second acute angles are equal.

7. A wide angle viewing system for viewing through a small aperture comprising:

a sensor positioned along a first axis remote from said aperture;

a first offset device having an input port and an output port, said output port having a viewing path along said first axis, said input port having a viewing path along a second axis, said second axis intersecting said first axis at said aperture;

means for rotating said first device about said first axis;

a second offset device having an input port and an output port, said second device output port having a viewing path along said second axis, said second device input port having a viewing path along a third axis, said third axis intersecting said first axis at the same point said second axis intersects said first axis; and means for rotating said second device about said second axis.

8. The invention according to claim 7:
wherein a first angle is formed by the intersection of said first and second axes and a second angle is formed by the intersection of said second and third axes; and
wherein said first angle equals said second angle.

9. The invention according to claim 8 wherein said second device is positioned so that said input port of said second offset device rotates within a cylindrical space extending perpendicularly from said aperture towards said output port of said first offset device.

10. The invention according to claim 9 wherein said cylindrical space is around said first axis.

11. The invention according to claim 10 wherein said second device output port is positioned to rotate within said input port of said first device.

12. The invention according to claim 8 wherein said second device output port is positioned to rotate within said input port of said first device.

13. The invention according to claim 7 wherein said second device output port is positioned to rotate within said input port of said first device.

14. A method of scanning a large field of regard through a small aperture using a narrow field of view device having at least two component parts, said method comprising the steps of:
rotating said device about a first axis of rotation; and
rotating a component of said device about a second axis of rotation, said first and second axes of rotation intersecting at said aperture.

15. The method according to claim 14:
wherein said field of regard is within a cone having a certain conical angle; and
wherein said first and second axes are at an angle with respect to one another equal to one fourth of said certain conical angle.

16. The method according to claim 15:
wherein said field of view has a viewing axis; and
wherein said first axis of rotation, said viewing axis and said second axis of rotation intersect at a common point.

17. The method according to claim 15 wherein said steps of rotating include rotating said component in discrete steps as said device is continuously rotated.

18. The method according to claim 15 wherein said steps of rotating include continuously rotating said component at a substantially slower rate than the rate at which said device is continuously rotated.

19. A method of scanning a large field of regard using a narrow field of view device having at least two component parts, said method comprising the steps of:
continuously rotating said device about an axis of rotation to define a periphery of said field of regard; and
rotating in discrete steps a component of said device between said axis of rotation and said periphery.

20. A method of scanning a large field of regard using a narrow field of view device having at least two component parts, said method comprising the steps of:
continuously rotating said device at a given rate about an axis of rotation to define a periphery of said field of regard; and
continuously rotating, at a rate which is substantially less than said given rate, a component of said device between said axis of rotation and said periphery.

21. The invention according to claim 1 wherein said first and second devices are rotated independent of movement of said aperture.

22. The method according to claim 14:
wherein said field of view has a viewing axis; and
wherein said first axis of rotation, said viewing axis and said second axis of rotation intersect at a common point.

* * * * *